(12) United States Patent
Tuschner et al.

(10) Patent No.: US 7,849,394 B2
(45) Date of Patent: Dec. 7, 2010

(54) LINKED CODE GENERATION REPORT

(75) Inventors: Kai Tuschner, Natick, MA (US); William Aldrich, Belmont, MA (US)

(73) Assignee: The Math Works, Inc., Natick, MA (US)

( * ) Notice: Subject to any disclaimer, the term of this patent is extended or adjusted under 35 U.S.C. 154(b) by 1280 days.

(21) Appl. No.: 10/057,126

(22) Filed: Oct. 25, 2001

(65) Prior Publication Data
US 2004/0205507 A1    Oct. 14, 2004

(51) Int. Cl.
*G06F 17/21* (2006.01)
*G06F 9/44* (2006.01)

(52) U.S. Cl. ............ 715/205; 715/208; 715/210; 717/104; 717/106; 717/123

(58) Field of Classification Search ............ 715/501.1, 715/502, 513, 526, 509, 205, 208, 210, 234, 715/206, 207; 717/106–109, 113, 123, 104, 717/120; 703/13
See application file for complete search history.

(56) References Cited

U.S. PATENT DOCUMENTS

| | | | | |
|---|---|---|---|---|
| 4,901,221 A * | 2/1990 | Kodosky et al. | ............ | 715/771 |
| 5,966,532 A * | 10/1999 | McDonald et al. | .......... | 717/105 |
| 5,978,818 A * | 11/1999 | Lin | ............. | 715/209 |
| 6,049,835 A * | 4/2000 | Gagnon | ............ | 709/245 |
| 6,122,647 A * | 9/2000 | Horowitz et al. | ............ | 715/205 |
| 6,219,628 B1 * | 4/2001 | Kodosky et al. | ............ | 703/2 |
| 6,269,475 B1 * | 7/2001 | Farrell et al. | .......... | 717/113 |
| 6,389,481 B1 * | 5/2002 | Malcolm | .......... | 719/310 |
| 6,493,740 B1 * | 12/2002 | Lomax | .......... | 718/107 |
| 6,675,370 B1 * | 1/2004 | Sundaresan | .......... | 717/106 |
| 6,792,418 B1 * | 9/2004 | Binnig et al. | .......... | 707/3 |
| 6,961,686 B2 * | 11/2005 | Kodosky et al. | .......... | 703/2 |
| 6,993,708 B1 * | 1/2006 | Gillig | .......... | 715/234 |
| 7,099,809 B2 * | 8/2006 | Dori | .......... | 703/6 |
| 7,114,149 B2 * | 9/2006 | Aptus et al. | .......... | 717/123 |
| 7,392,469 B1 * | 6/2008 | Bailin | .......... | 715/230 |
| 2002/0016206 A1 * | 2/2002 | Yoshimi et al. | .......... | 463/42 |
| 2002/0054138 A1 * | 5/2002 | Hennum | .......... | 345/804 |
| 2002/0055891 A1 * | 5/2002 | Yang | .......... | 705/27 |
| 2002/0072049 A1 * | 6/2002 | Prahalad | .......... | 434/365 |
| 2002/0078010 A1 * | 6/2002 | Ehrman et al. | .......... | 707/1 |
| 2002/0083413 A1 * | 6/2002 | Kodosky et al. | .......... | 717/109 |
| 2002/0099852 A1 * | 7/2002 | Fischer | .......... | 709/246 |
| 2002/0129058 A1 * | 9/2002 | Story et al. | .......... | 707/513 |
| 2002/0170048 A1 * | 11/2002 | Zgarba et al. | .......... | 717/168 |
| 2002/0188928 A1 * | 12/2002 | Szpak et al. | .......... | 717/106 |
| 2003/0016206 A1 * | 1/2003 | Taitel | .......... | 345/103 |
| 2003/0018953 A1 * | 1/2003 | Aberg | .......... | 717/105 |
| 2003/0037312 A1 * | 2/2003 | Czech | .......... | 717/120 |
| 2003/0069908 A1 * | 4/2003 | Anthony et al. | .......... | 707/513 |
| 2003/0107595 A1 * | 6/2003 | Ciolfi | .......... | 345/762 |
| 2003/0120549 A1 * | 6/2003 | Lindner | .......... | 705/17 |
| 2003/0137522 A1 * | 7/2003 | Kaasila et al. | .......... | 345/619 |
| 2003/0195732 A1 * | 10/2003 | Kodosky et al. | .......... | 703/2 |
| 2004/0031015 A1 * | 2/2004 | Ben-Romdhane et al. | ... | 717/107 |
| 2007/0288885 A1 * | 12/2007 | Brunel et al. | .......... | 717/104 |

* cited by examiner

*Primary Examiner*—Adam L Basehoar
(74) *Attorney, Agent, or Firm*—Nelson Mullins Riley & Scarborough LLP; Kevin J. Canning

(57) ABSTRACT

A method includes generating source code corresponding to a block diagram model and generating hypertext links associating elements of the generated source code with elements of the block diagram model.

27 Claims, 4 Drawing Sheets

FIG. 5

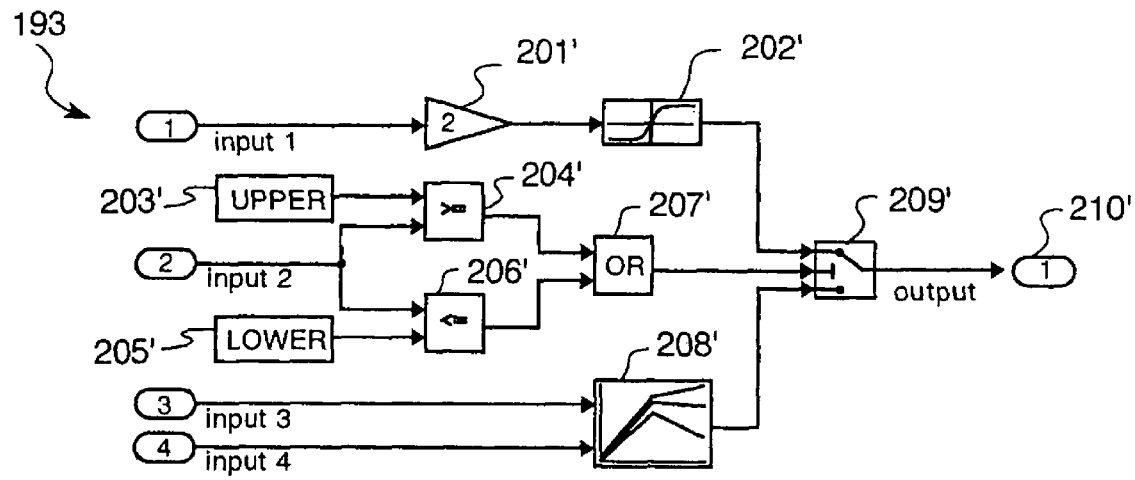

```
Block:
   209      /* Switch: '<Root>/Switch' incorporates:
   207       *   Logic: '<Root>/Logical Operator'
   204       *   RelationalOperator: '<Root>/Relational Operator1'
   203       *   Constant: '<Root>/Constant'
input2       *   Inport: '<Root>/In2'
   206       *   RelationalOperator: '<Root>/Relational Operator'
   205       *   Constant: '<Root>/Constant1'
   202       *   Lookup: '<Root>/Look-Up Table'
   201       *   Gain: '<Root>/Gain'
input1       *   Inport: '<Root>/In1'
   208       *   Lookup2D: '<S1>/Look-Up Table (2-D)'
input3       *   Inport: '<Root>/In3'
input4       *   Inport: '<Root>/In4'
             *
             * Regarding '<Root>/Gain':
   201       *   Gain value: 2.0
             */
```

LINKED CODE GENERATION REPORT

TECHNICAL FIELD

This invention relates to linked code generation reports.

BACKGROUND

Data representation and modeling are an integral part of working with dynamic real-world systems such as electrical circuits, shock absorbers, braking systems, and many other electrical, mechanical and thermodynamic systems. These systems may be modeled, simulated and analyzed on a computer system using block diagram modeling. Block diagram modeling graphically depicts mathematical relationships among a system's inputs, states, parameters, and outputs, typically through the use of a graphical user interface (GUI). Block diagram modeling also graphically depicts time-dependent mathematical relationships among a system's inputs, states and outputs, typically for display on the GUI.

Block diagram modeling may involve automatic code generation, a process whereby software source code is automatically produced from a block diagram model of a dynamic system. The software source code produced by the automatic code generation process may be compiled and executed on a target processor, implementing the functionality specified by the model.

It is common for the code generated by an automatic code generator to include explanatory comments. Typically, such comments act as headers to generated functions or data structures, and provide an indication of how those functions or data structures logically relate to the block diagram model.

SUMMARY

According to one aspect of the invention, a method includes generating source code corresponding to a block diagram model, and generating hypertext links associating elements of the generated source code with elements of the block diagram model.

One or more of the following features may also be included. The method may further include displaying the source code and hypertext links on a display, receiving input from a user representing the selection of one of the hypertext links, and displaying to the user at least a portion of the block diagram model including an element of the model associated with the hypertext link. Displaying may include displaying the associated element in a highlighted fashion. At least one of the associated elements in the generated source code may be a commented reference to a block in the block diagram model. At least one of the associated elements in the generated source code may be a variable reference in an operative code section. The hypertext link may be Standard Generalized Markup Language (SGML) or Hypertext Markup Language (HTML). The hypertext language may be Extensible Markup Language (XML). The commented reference to a block may include a character string identifying a path to a file providing information relating to the sections of the block.

According to another aspect of the invention, a system includes means for generating source code corresponding to a block diagram model and means for generating hypertext links associating elements of the generated source code with elements of the block diagram model.

One or more of the following features may also be included. The system may further include means for displaying the source code and hypertext links on a display, means for receiving input from a user representing the selection of one of the hypertext links, and means for displaying to the user at least a portion of the block diagram model including an element of the model associated with the hypertext link. The means for displaying to the user at least a portion of the block diagram model may include displaying the associated element in a highlighted fashion. At least one of the associated elements in the generated source code may be a commented reference to a block in the block diagram model. At least one of the associated elements in the generated source code may be a variable reference in an operative code section. The hypertext link may be Standard Generalized Markup Language (SGML) or Hypertext Markup Language (HTML). The hypertext language may be Extensible Markup Language (XML). The commented reference to a block may include a character string identifying a path to a file providing information relating to the sections of the block.

Embodiments may have one or more of the following advantages.

The system provides easy access and direct navigation from a syntax-highlighted code generation report to a block in a block diagram model. The use of the syntax-highlighted code generation report enables the user to directly view and access blocks in a block diagram model from their corresponding source code within a browser's window while at the same time allowing the user to modify, reconfigure, and view other relevant data pertaining to the blocks under analysis as the block is being viewed. Moreover, in addition to the ease of instant navigation, the traceability of the source code back to the corresponding block increases efficiency in data modeling, processing, and analysis, and is beneficial in increasing accuracy of results and minimizing analytical human error.

The syntax-highlighted code generation report provides increased efficiency and operation in terms of the usage, storage, and management of information. Information about a particular dynamic system is quickly and efficiently accessed as well as managed and stored in an efficient manner.

The syntax-highlighted code generation report enables a user to efficiently control the information related to the data to be used with a block-based design environment, as opposed to having to exit, enter, re-enter, close or open new viewing windows to access source code information about the block. This facilitates a seamless transfer and view of information from the source code to the block-based design environment, enabling users to have a location with all the information required for analyzing and studying a block diagram model and/or system. Moreover, this reduces the redundancy, inconsistency and errors associated with having multiple sources of access to the source code. In addition, the ability to easily and quickly link the block to the source code makes it possible for users to reliably work without interruption, reducing inconsistency and redundancy.

Syntax-highlighted code generation reports simplify the task of defining, viewing, and modifying data associated with the block.

The source code accessed from the syntax-highlighted code generation report is available throughout the block-based design environment and is propagated to all stages of the process.

Other features, objects, and advantages of the invention will be apparent from the description and drawings, and from the claims.

DESCRIPTION OF DRAWINGS

FIG. 5 illustrates an exemplary model diagram and associated syntax highlighted code generation report.

DETAILED DESCRIPTION

Figure 1:
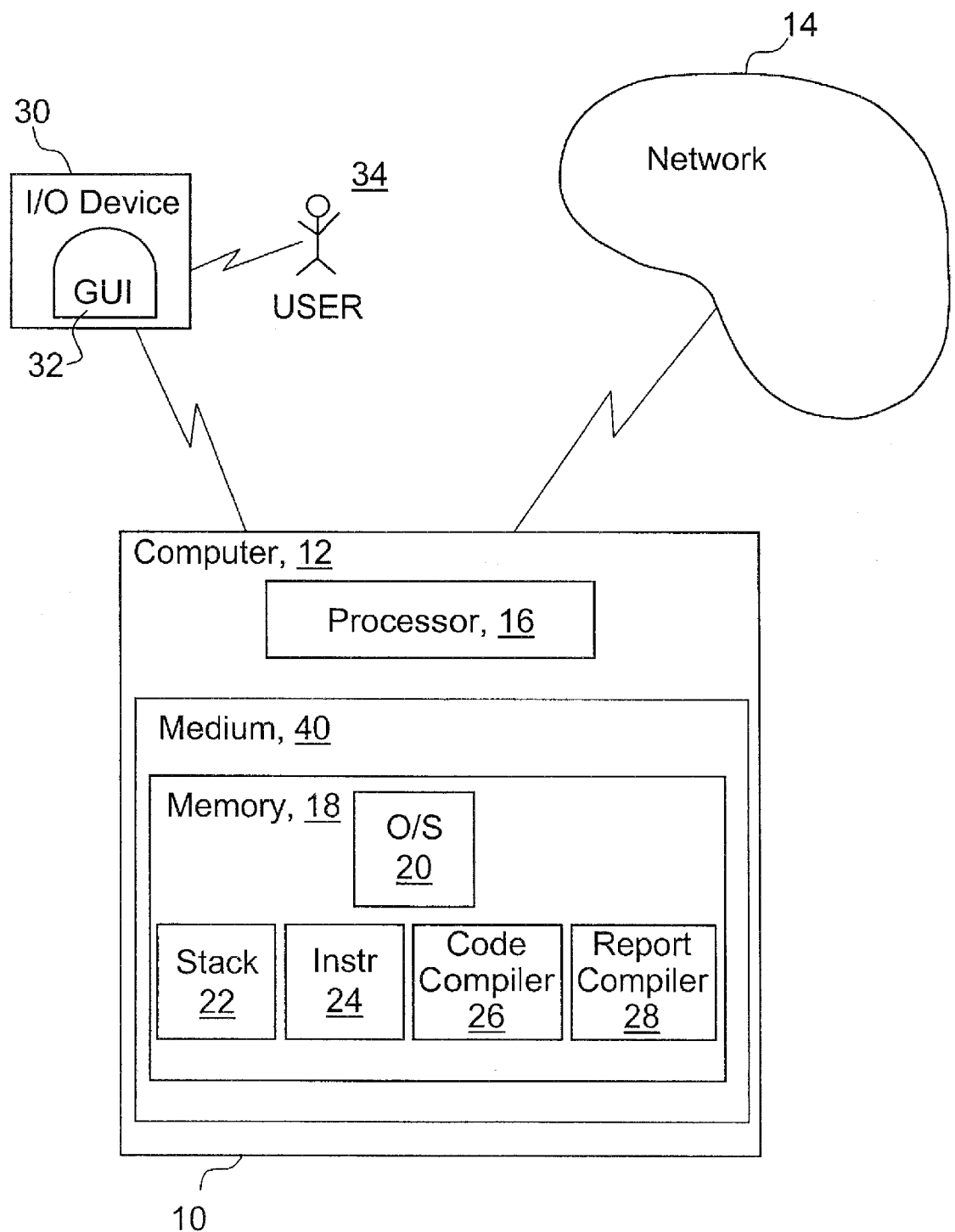
FIG. 1 is a block diagram of a code generation report generating system.

FIG. 1 shows a processing system 10. The processing system 10 includes a computer 12, such as a personal computer (PC). Computer 12 is connected to a network 14, such as the Internet, that runs TCP/IP (Transmission Control Protocol/Internet Protocol) or another suitable protocol. Connections may be via Ethernet, wireless link, telephone line, and the like.

Computer 12 contains a processor 16 and a computer readable medium 40. Computer readable medium 40 may contain memory 18. The computer readable medium 40 may be, for example (but is not limited to), RAM, ROM, or a hard disk drive. Memory 18 stores an operating system ("OS") 20 such as Windows98® or Linux, a TCP/IP protocol stack 22 for communicating over network 14, and machine-executable instructions 24 executed by processor 16 to perform linked code generation report process 100 below. The memory 18 also includes a code compiler 26 and a report compiler 28. Computer 12 also includes an input/output (I/O) device 30 for display of a graphical user interface (GUI) 32 to a user 34.

Figure 2:
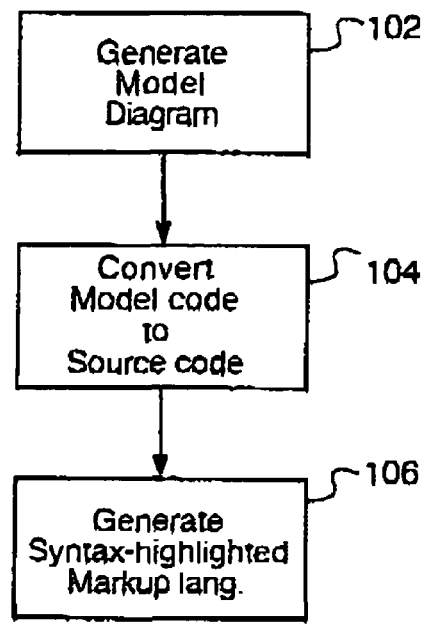
FIG. 2 is a flow diagram of the link code generation report process of FIG. 1.

Referring to FIG. 2, the linked code generation report process 100 includes generating (102) a model diagram. The model diagram represents a dynamic system to be simulated and is displayed to the user 34 on the GUI 32 of the input/output device 30.

The model diagram is specified by the user 34 and represented by a source model language such as, for example, Simulink® from The Mathworks, Inc. of Natick, Mass., incorporated herein by reference. The process 100 converts (104) in the code compiler 26 the source model language into program source code in a technique generally referred to as code generation. Code generation is a technique whereby software, i.e., program source code such as C, Ada, Basic and Java®, is automatically produced from the source model language representing by the model diagram. The software source code produced may be compiled and then executed on a target processor, implementing the functionality of the specified model diagram.

An example automatic code generator is Real Time Workshop® Embedded Coder from The Mathworks, Inc. of Natick, Mass., incorporated herein by reference.

The process 100 generates (106) using the report compiler 28 a markup language document, generally referred to as a code generation report, that contains information about the source model language, settings of the code generator and the generated program source code in syntax highlighted form. Each part of the generated program source code is translated by the report compiler 28 and saved into its own markup language file. The markup language file is generally referred to as a syntax-highlighted code generation report.

The generated markup language files contain hyperlinks to the source model language representing the model diagram and allow the user 34 to navigate from the markup language file to the source model language and the block it represents in the model diagram. This provides the user 34 with an ability to identify a block that corresponds to selected code fragments in the generated program source code.

A hyperlink is a selectable connection from one word, picture, or information object to another. In a multimedia environment such as the World Wide Web, such objects can include sound and motion video sequences. The most common form of link is the highlighted word or picture that can be selected by the user (with a mouse or in some other fashion), resulting in the immediate delivery and view of another file. The highlighted object is referred to as an anchor. The anchor reference and the object referred to constitute a hyperlink.

Figure 3:
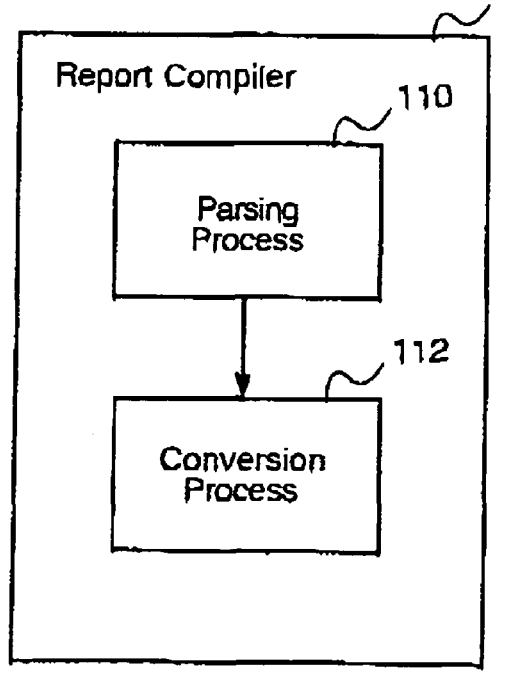
FIG. 3 is a diagram of the report compiler of FIG. 1.

Referring to FIG. 3, the report compiler 28 includes a parsing process 110 and a software source code markup language conversion process 112. The parsing process 110 analyzes the generated software source code and replaces listed block references in the comment sections with links that refer back to the corresponding sections within the source model language representing the blocks of the model diagram. The software source code to markup language conversion process 112 converts the generated software source code to the syntax highlighted markup language code generation report.

Figure 4:
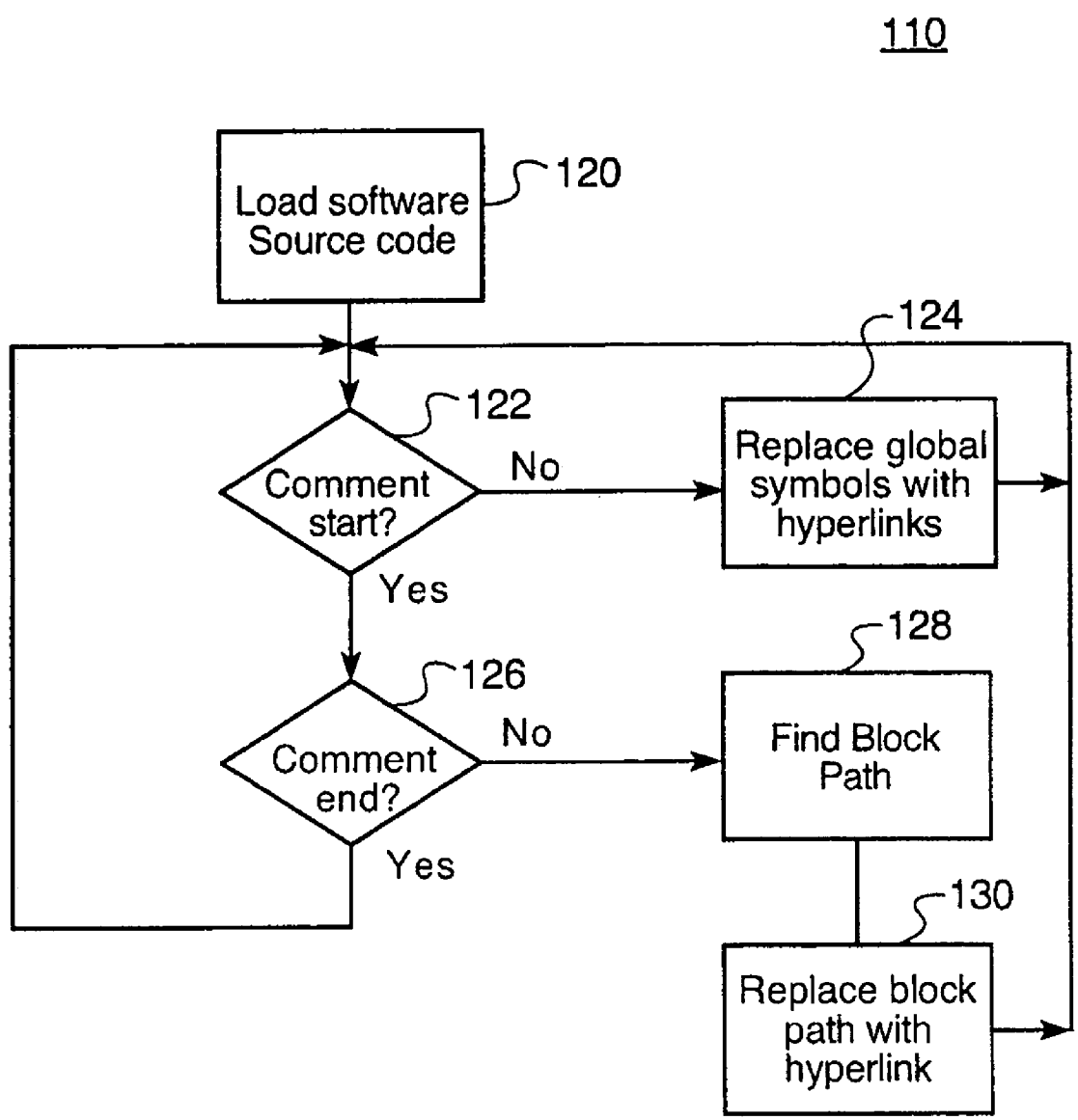
FIG. 4 is a flow diagram of the parsing process of FIG. 3.

The parsing process 110 is best understood by using a C source code example. Referring to FIG. 4, the parsing process 110 includes loading (120) the C program source code into memory 18. For each line of C program code, process 110 determines (122) whether the parser is at the start of a comment line. In the C language, a comment begins with the special symbols "\*". If no comment start is detected, the process 110 replaces (124) global symbol names with hyperlinks and may color keywords according to the syntax. If a comment start is detected, the process 110 determines (126) whether a comment end is detected. In the C language, a comment ends with the special symbols "*\". If no comment end is detected, the process 110 finds (128) a block path within the comment by applying a multiple pattern match. If a block path is detected, the process 110 replaces (130) the block path with a special hyperlink back to the model diagram. This special hyperlink contains a command that highlights the references block, like the following example:

<A href="execute:highight_system model/Block_A">model/BlockA</A>

The above command may be executed if the user 34 selects the hyperlink, and the user 34 has a browser capable of executing the command in the model diagram environment.

Referring to FIG. 5, an exemplary model diagram 193 and associated syntax highlighted code generation report 192 are shown. The hyperlinks in the report 192 are numbered to illustrate their correspondence to the blocks of the model diagram 193. For example, 201 in the report 192 is a hyperlink to the gain block 201' in model diagram 193.

Further aspects, features and advantages will become apparent from the following claims.

What is claimed is:

1. An electronic device implemented method for generating a code generation report from a simulatable block diagram model comprising a plurality of graphical elements, the simulatable block diagram model provided in a modeling environment, the method comprising:

creating a source model representation of the block diagram model in a first language;

generating source code in a second language from the source model representation using a code compiler, the second language being distinct from the first language, wherein:

the generated source code includes one or more comments in the second language, the one or more comments identifying a corresponding element in the block diagram, and the one or more comments include a block path identifying a section of the source model representation represented in the first language that corresponds to the element in the block diagram model;

generating a code generation report from the generated source code using a report compiler, the generating of the code generation report comprising:

parsing, using the report compiler, the one or more comments in the generated source code to identify the block path, and replacing the block path with a hyperlink, where the hyperlink:

refers to the element of the block diagram model that corresponds to the section of the source model representation identified by the block path, provides a link from the code generation report to the element in the block diagram model, and includes a command that is executable in the modeling environment, the command relating to the element in the block diagram model; and displaying the code generation report to a user.

2. The method of claim 1 further comprising:

receiving input from a user representing a selection of the at least one hyperlink; and displaying to the user at least a portion of the block diagram model including the element of the model associated with the hyperlink.

3. The method of claim 2, wherein displaying to the user at least a portion of the block diagram model comprises displaying the associated element in a highlighted fashion.

4. The method of claim 1, wherein the parsing replaces a variable reference in the generated code with a hyperlink to an associated element in the block diagram model.

5. The method of claim 1 wherein the hyperlink is Standard Generalized Markup Language (SGML).

6. The method of claim 1 wherein the hyperlink is Hypertext Markup Language (HTML).

7. The method of claim 4 wherein the hyperlink is Extensible Markup Language (XML).

8. The method of claim 1 wherein the at least one comment listing a reference to a block comprises a character string identifying a path to a file providing information relating to a section of the block.

9. A system for generating a code generation report from a simulatable block diagram model comprising a plurality of graphical elements, the simulatable block diagram model provided in a modeling environment, the system comprising:

means for creating a source model representation of the block diagram model in a first language;

means for generating source code in a second language from the source model representation, the second language being distinct from the first language, wherein the generated source code includes at least one comment in the second language that includes a block path, the block path identifying a section of the source model representation represented in the first language that corresponds to a block in the block diagram model;

means for generating a code generation report from the generated source code, the generating of the code generation report parsing the at least one comment in the generated source code to identify the block path and replacing at least a portion of the at least one comment with at least one hyperlink that refers to an element of the block diagram model that corresponds to the section of the source model representation identified by the block path, the hyperlink linking from the code generation report to the element of the block diagram model, the hyperlink comprising a command that is executable in the modeling environment, the command relating to the element in the block diagram model; and an output device for displaying the code generation report to a user.

10. The system of claim 9 further comprising:

means for receiving input from a user representing a selection of the hyperlink; and means for displaying to the user at least a portion of the block diagram model including the element of the model associated with the hyperlink.

11. The system of claim 10, wherein the means for displaying to the user at least a portion of the block diagram model comprises displaying the associated element in a highlighted fashion.

12. The system of claim 9, wherein the parsing replaces a variable reference in the generated code with a hyperlink to an associated element in the block diagram model.

13. The system of claim 9 wherein the hyperlink is Standard Generalized Markup Language (SGML).

14. The system of claim 9 wherein the hyperlink is Hypertext Markup Language (HTML).

15. The system of claim 14 wherein the hyperlink is Extensible Markup Language (XML).

16. The system of claim 9 wherein the at least one comment listing a reference to a block comprises a character string identifying a path to a file providing information relating to a section of the block.

17. A computer program product residing on a non-transitory computer readable medium having instructions stored thereon for generating a code generation report from a simulatable block diagram model comprising a plurality of graphical elements, the simulatable block diagram model provided in a modeling environment, the instructions when executed by one or more processors cause the one or more processors to:

create a source model representation of the block diagram model in a first language;

generate source code in a second language from the source model representation, the second language being distinct from the first language, the generated source code including at least one comment in the second language that includes a block path, the block path identifying a section of the source model representation represented in the first language that corresponds to a block in the block diagram model;

generate a code generation report from the generated source code, the generating of the code generation report parsing the at least one comment in the generated source code to identify the block path and replacing at least a portion of the at least one comment with at least one hyperlink that refers to an element of the block diagram model corresponding to the section of the source model representation identified by the block path, the hyperlink linking from the code generation report to the element of the block diagram model, the hyperlink comprising a command that is executable in the modeling environment, the command relating to the element in the block diagram model; and display the code generation report to a user.

18. The computer program product of claim 17 wherein the computer readable medium is a random access memory (RAM).

19. The computer program product of claim 17 wherein the computer readable medium is read only memory (ROM).

20. The computer program product of claim 17 wherein the computer readable medium is hard disk drive.

21. A computing system for generating a code generation report from a simulatable block diagram model comprising a plurality of graphical elements, the simulatable block diagram model provided in a modeling environment, the system comprising:
   a processor and
   a memory,
   wherein the processor and memory are configured to:
      create a source model representation of the block diagram model in a first language;
      generate source code in a second language from the source model representation, the second language being distinct from the first language, the generated source code including at least one comment in the second language including a block path that identifies a section of the source model representation represented in the first language that corresponds to a block in the block diagram model;
      generate a code generation report from the generated source code, the generating of the code generation report parsing the at least one comment in the generated source code to identify the block path and replacing at least a portion of the at least one comment with at least one hyperlink that refers to an element of the block diagram model corresponding to the section of the source model representation identified by the block path, the hyperlink linking from the code generation report to the element of the block diagram model, the hyperlink comprising a command that is executable in the modeling environment, the command relating to the element in the block diagram model; and
      display the code generation report to a user.

22. The system of claim 21 wherein the processor and the memory are incorporated into a personal computer.

23. The system of claim 21 wherein the processor and the memory are incorporated into a network server capable of Internet communication.

24. The system of claim 21 wherein the processor and the memory are incorporated into a single board computer.

25. An electronic device implemented method for generating a document having information about source code associated with a graphical model, the graphical model provided in a modeling environment, and providing a hyperlink referencing an element of the graphical model in the document, the method comprising the steps of:
   creating a source model representation of the graphical model in a first language;
   providing source code identifying an element of the graphical model, the source code provided in a second language that is distinct from the first language, wherein the graphical model is a simulatable graphical model represented, the source code including at least one comment in the second language including a block path that identifies a section of the source model representation represented in the first language, the block path corresponding to a block in the graphical model;
   generating a document from the source code, the generating of the document parsing the at least one comment in the generated source code to identify the block path and replacing at least a portion of the at least one comment with at least one hyperlink that refers to an element of the graphical model corresponding to the section of the source model representation identified by the block path, the at least one hyperlink linking from the document to the element of the graphical model, the hyperlink comprising a command that is executable in the modeling environment, the command relating to the element in the graphical model; and
   displaying the document to a user.

26. The method of claim 25 further comprising:
   selecting the hyperlink to display or identify the referenced element in the graphical model.

27. The method of claim 25 further comprising:
   providing the hyperlink at a location in the document having information about a portion of source code identifying the element of the graphical model.

* * * * *

UNITED STATES PATENT AND TRADEMARK OFFICE
CERTIFICATE OF CORRECTION

PATENT NO. : 7,849,394 B2  Page 1 of 1
APPLICATION NO. : 10/057126
DATED : December 7, 2010
INVENTOR(S) : Kai Tuschner et al.

It is certified that error appears in the above-identified patent and that said Letters Patent is hereby corrected as shown below:

On the Title Page, Item (73), please change the Assignee from "The Math Works, Inc." to --The MathWorks, Inc.--.

Signed and Sealed this
Thirteenth Day of November, 2012

David J. Kappos
*Director of the United States Patent and Trademark Office*